(12) United States Patent
Sahoo

(10) Patent No.: US 9,948,861 B2
(45) Date of Patent: Apr. 17, 2018

(54) METHOD AND APPARATUS FOR CAPTURING AND DISPLAYING AN IMAGE

(71) Applicant: SAMSUNG ELECTRONICS CO., LTD., Suwon-si (KR)

(72) Inventor: Ritesh Sahoo, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/077,577

(22) Filed: Nov. 12, 2013

(65) Prior Publication Data

US 2014/0132817 A1    May 15, 2014

(30) Foreign Application Priority Data

Nov. 12, 2012  (IN) .......................... 4721/CHE/2012
Sep. 11, 2013  (KR) ........................ 10-2013-0109214

(51) Int. Cl.
*H04N 5/232*        (2006.01)

(52) U.S. Cl.
CPC ..... *H04N 5/23293* (2013.01); *H04N 5/23219* (2013.01); *H04N 5/23222* (2013.01)

(58) Field of Classification Search
CPC .................................................. H04N 5/23293
USPC ..................... 348/333.11; 382/115; 345/175
See application file for complete search history.

(56) References Cited

U.S. PATENT DOCUMENTS

| | | | |
|---|---|---|---|
| 7,304,681 B2 | 12/2007 | Larner et al. | |
| 2002/0110373 A1* | 8/2002 | Engle et al. | 396/263 |
| 2003/0189647 A1* | 10/2003 | Kang | H04N 5/232 |
| | | | 348/207.99 |
| 2004/0070679 A1 | 4/2004 | Pope | |
| 2008/0204575 A1 | 8/2008 | Shiga et al. | |
| 2010/0053370 A1* | 3/2010 | Crisan et al. | 348/231.2 |
| 2010/0321530 A1 | 12/2010 | Baek | |
| 2011/0310261 A1 | 12/2011 | Crisan et al. | |
| 2012/0105703 A1 | 5/2012 | Lee et al. | |
| 2012/0154305 A1* | 6/2012 | Nunomaki | 345/173 |
| 2013/0135254 A1* | 5/2013 | Lee et al. | 345/175 |
| 2013/0314558 A1* | 11/2013 | Ju | H04N 5/23222 |
| | | | 348/208.99 |

FOREIGN PATENT DOCUMENTS

| | | |
|---|---|---|
| CN | 102467343 A | 5/2012 |
| CN | 102572271 A | 7/2012 |
| EP | 1231502 A1 | 8/2002 |
| EP | 2161924 A1 | 3/2010 |

(Continued)

OTHER PUBLICATIONS

Search Report dated Feb. 25, 2014, issued by the International Searching Authority in counterpart International Application No. PCT/KR2013/010242.

(Continued)

*Primary Examiner* — Joel Fosselman

(74) *Attorney, Agent, or Firm* — Sughrue Mion, PLLC

(57) ABSTRACT

A method and apparatus for displaying an image. The method includes: recognizing a movement of an object that approaches an image capture button; capturing a plurality of frames in response to the recognized movement of the object; and displaying a predetermined frame from among the plurality of captured frames on a display unit.

20 Claims, 14 Drawing Sheets

(56) References Cited

FOREIGN PATENT DOCUMENTS

EP           2450899  A1      5/2012

OTHER PUBLICATIONS

Written Opinion dated Feb. 25, 2014, issued by the International Searching Authority in counterpart International Application No. PCT/KR2013/010242.
Communication dated Jun. 15, 2016, issued by the European Patent Office in counterpart European Patent Application No. 13853813.7.
Communication dated May 4, 2017 issued by the State Intellectual Property Office of P.R. China in counterpart Chinese Patent Application No. 201380059084.X.
Communication dated Jan. 3, 2018, issued by the State Intellectual Property Office of P.R. China in counterpart Chinese Patent Application No. 201380059084.X.

* cited by examiner

FIG. 14
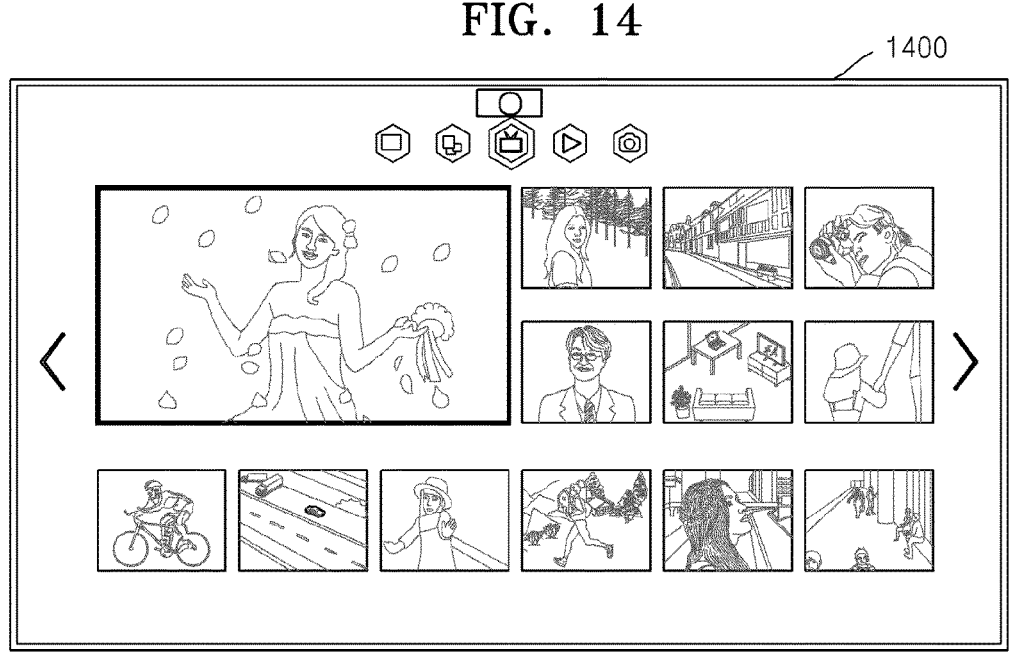
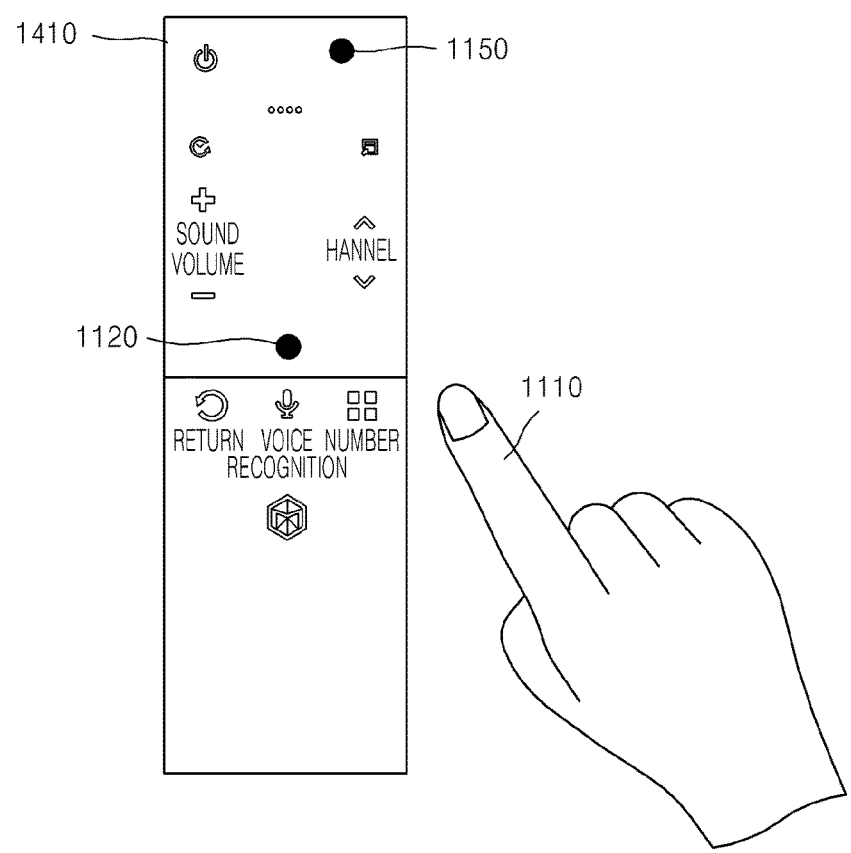

FIG. 15
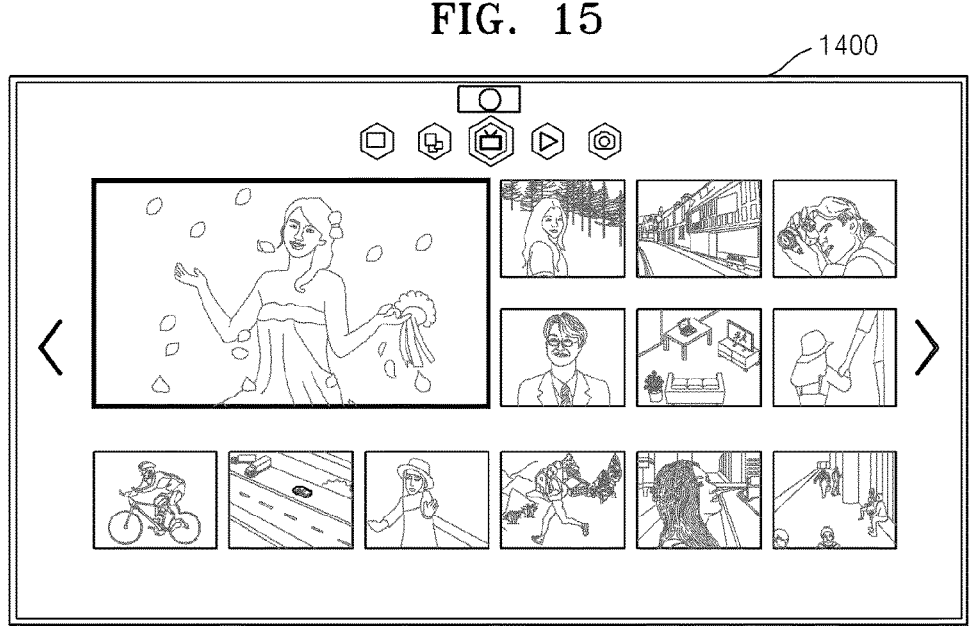
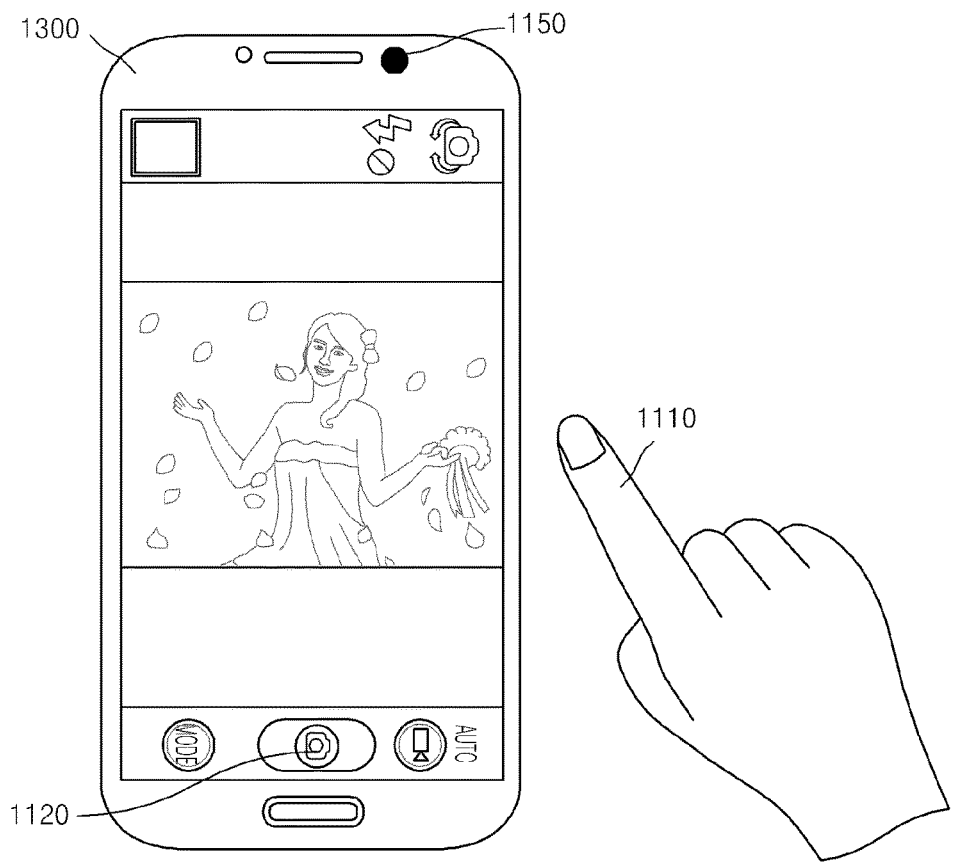

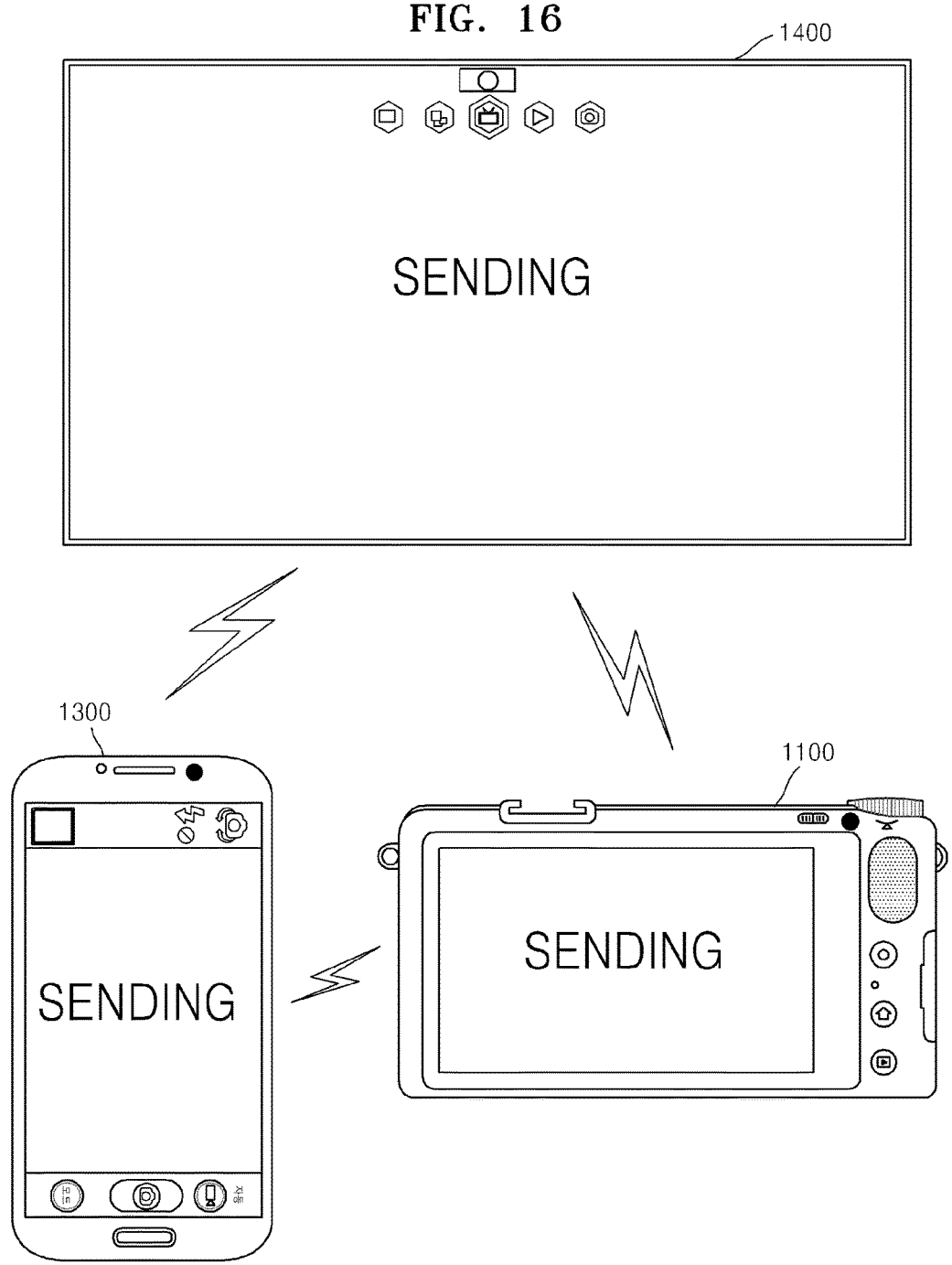

METHOD AND APPARATUS FOR CAPTURING AND DISPLAYING AN IMAGE

RELATED APPLICATIONS

This application claims the benefit of Indian Patent Application No. 4721/CHE/2012, filed on Nov. 12, 2012, in the Indian Patent Office, and Korean Patent Application No. 10-2013-0109214, filed on Sep. 11, 2013, in the Korean Intellectual Property Office, the disclosures of which are incorporated herein in their entirety by reference.

BACKGROUND

1. Field

One or more exemplary embodiments relate to a method and apparatus for displaying an image.

2. Description of the Related Art

A digital photographing apparatus may display or store an image obtained by using an imaging device. A digital photographing apparatus may capture a still image or a moving image. An existing digital photographing apparatus captures an image when a user clicks a capture button. However, there is a delay time between a point of time when the user decides to capture an image and a point of time when the digital photographing apparatus captures the image. Accordingly, there is a demand for a method of capturing an image at the very point of time that is desired by a user.

SUMMARY

One or more exemplary embodiments include a method and apparatus for capturing and displaying an image by reducing a delay time.

One or more exemplary embodiments include a method and apparatus for capturing and displaying an image that is desired by a user by reducing a delay time.

Additional aspects will be set forth in part in the description which follows and, in part, will be apparent from the description, or may be learned by practice of the presented embodiments.

According to one or more exemplary embodiments, a method of displaying an image includes: recognizing a movement of an object that approaches an image capture button; capturing a plurality of frames in response to the recognized movement of the object; and displaying a predetermined frame from among the plurality of captured frames on a display unit.

The method may further include searching for the predetermined frame from among the plurality of captured frames by using the movement of the object that approaches the image capture button.

The method may further include determining a time between a point of time when the movement of the object that approaches the image capture button is recognized and a point of time when the image capture button is clicked.

The searching may include searching for the predetermined frame based on the determined time.

The searching may include considering at least one of a time that is delayed due to the operation of a camera shutter and a time that is delayed due to the adjustment of a camera lens based on the determined time.

The method may further include storing the searched for predetermined frame.

The method may further include transmitting the searched for predetermined frame to another device.

The movement of the object may be a movement of a user's finger.

The image capture button may be provided in any one of a digital camera, a cell phone that has a camera function, and a remote controller of a TV that has an image capturing function. The image capture button may be provided in various forms. As non-limiting examples, the image capture button may be provided as a physical button, a context-sensitive button, or a region on a touch-sensitive display.

The recognizing may include accurately recognizing the movement of the object by using a user's movement pattern.

According to one or more exemplary embodiments, an apparatus for displaying an image includes: a recognition unit that recognizes a movement of an object that approaches an image capture button; a capturing unit that captures a plurality of frames in response to the recognized movement of the object; and a display unit that displays a predetermined frame from among the plurality of captured frames.

The apparatus may further include a searching unit that searches for a predetermined frame from among the plurality of captured frames by using the movement of the object that approaches the image capture button.

The apparatus may further include a determining unit that determines a time between a point of time when the movement that approaches the image capture button is recognized and a point of time when the image capture button is clicked.

The searching unit may search for the predetermined frame based on the determined time.

The searching unit may consider at least one of a time that is delayed due to the operation of a camera shutter and a time that is delayed due to the adjustment of a camera lens based on the determined time.

The apparatus may further include a storage unit that stores the searched for predetermined frame.

The apparatus may further include a transmission unit that transmits the searched for predetermined frame to another device.

The image capture button may be provided in any one of a digital camera, a cell phone that has a camera function, and a remote controller of a TV that has an image capturing function.

The recognition unit may accurately recognize the movement of the object by using a user's movement pattern.

According to one or more embodiments a computer-readable recording medium may have embodied thereon a program for executing the method.

BRIEF DESCRIPTION OF THE DRAWINGS

These and/or other aspects will become apparent and more readily appreciated from the following description of the embodiments, taken in conjunction with the accompanying drawings in which:

FIG. 14 is a view for explaining a method of displaying an image, according to another exemplary embodiment;

FIG. 15 is a view for explaining a method of displaying an image, according to another exemplary embodiment; and FIG. 16 is a view for explaining a method of transmitting an image, according to an exemplary embodiment.

DETAILED DESCRIPTION

Figure 1:
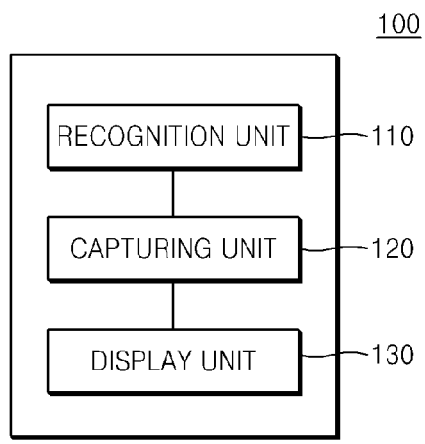
FIG. 1 is a block diagram illustrating a configuration of an apparatus for displaying an image, according to an exemplary embodiment.

The advantages and features of the present invention and methods of achieving the advantages and features will be described more fully with reference to the accompanying drawings, in which exemplary embodiments of the invention are shown. The invention may, however, be embodied in many different forms and should not be construed as being limited to the embodiments set forth herein; rather these embodiments are provided so that this disclosure will be thorough and complete, and will fully convey the concept of the invention to one of ordinary skill in the art. The scope of the present invention is defined by the appended claims. The same reference numerals denote the same elements throughout.

Terms used herein will be briefly explained and exemplary embodiments will be explained in detail.

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

Unless the context dictates otherwise, the word "comprise" or variations such as "comprises" or "comprising" is understood to mean "includes, but is not limited to" such that other elements that are not explicitly mentioned may also be included. The term "unit" in the embodiments of the present invention means a software component or hardware components such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

The present invention will now be described more fully with reference to the accompanying drawings for those of ordinary skill in the art to be able to perform the present invention without any difficulty. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. Also, parts in the drawings unrelated to the detailed description are omitted to ensure clarity of the present invention.

The term "image" used herein may refer to data composed of discrete image elements (for example, pixels for two-dimensional (2D) images). For example, the image may include an image of an object obtained by using a digital photographing apparatus.

The term "user" used herein may refer to, but is not limited to, a photographer or person who captures an image by using an apparatus for displaying an image.

The term "photographing apparatus" or "digital photographing apparatus" used herein may refer to, but is not limited to, an apparatus for capturing an image such as a camera of a cell phone or a smartphone, a camera of a personal digital assistant (PDA), or a camera mounted on a TV.

As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram illustrating a configuration of an apparatus 100 for displaying an image, according to an exemplary embodiment.

Referring to FIG. 1, the apparatus 100 may include a recognition unit 110, i.e. a recognizer or a sensor, a capturing unit 120, i.e. a capturer, and a display unit 130, i.e. a display.

The recognition unit 110 may recognize a movement of an object that approaches an image capture button.

The capturing unit 120 may capture a plurality of images in response to the recognized movement of the object.

The display unit 130 may display a predetermined image that is searched for on a display unit. Examples of the display unit may include a cathode-ray tube (CRT) display unit, a liquid crystal display (LCD) unit, a plasma display panel (PDP) display unit, an organic light-emitting diode (OLED) display unit, a field emission display (FED) unit, a light-emitting diode (LED) display unit, a vacuum fluorescent display (VFD) unit, a digital light processing (DLP) display unit, a primary flight display (PFD) unit, a three-dimensional (3D) display unit, and a transparent display unit. Also, the display unit may be, but is not limited to, attached or connected to the apparatus 100.

Figure 2:
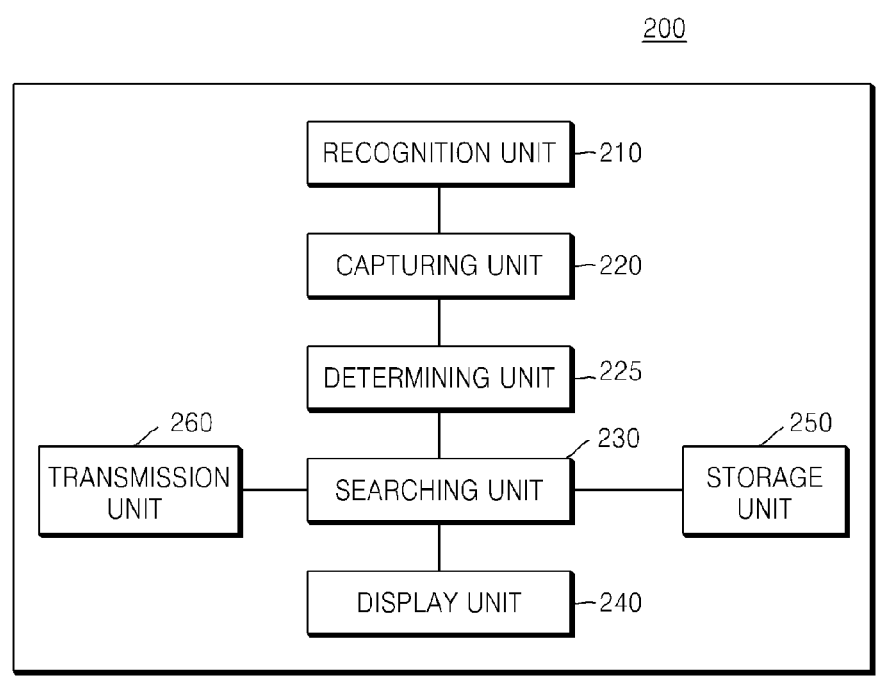
FIG. 2 is a block diagram illustrating a configuration of an apparatus for displaying an image, according to another exemplary embodiment.

FIG. 2 is a block diagram illustrating a configuration of an apparatus 200 for displaying an image, according to another exemplary embodiment.

Referring to FIG. 2, the apparatus 200 may include a recognition unit 210, a capturing unit 220, a determining unit 225, i.e. a determiner, a searching unit 230, i.e. a searcher or a selector, a display unit 240, a storage unit 250, i.e. a storage, and a transmission unit 260, i.e. a transmitter.

The recognition unit 210, the capturing unit 220, and the display unit 240 are respectively the same as the recognition unit 110, the capturing unit 120, and the display unit 130 of FIG. 1.

The determination unit 225 may determine a time between a point of time when a motion that approaches the image capture button is recognized and a point of time when the image capture button is clicked, i.e., touched or selected.

The apparatus 200 may include a processor (not shown) for processing a command to determine a time.

Figure 10:
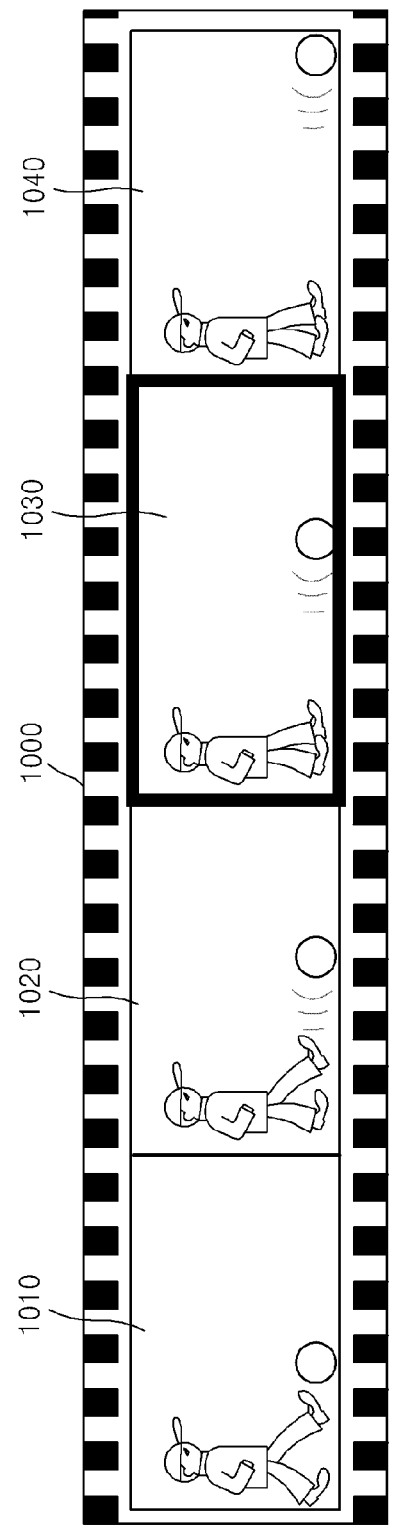
FIG. 10 is a view illustrating a process of selecting an image after a plurality of images are captured, according to an exemplary embodiment.

The searching unit 230 may search for a predetermined image from among a plurality of captured images by using the movement of the object that approaches the image capture button. FIG. 10 is a view illustrating a process of selecting an image after the plurality of images 1000 are captured, according to an exemplary embodiment. The process of selecting an image will be discussed further below.

In order to search for the predetermined image, one or more image processing algorithms may be used.

A method of recognizing the movement of the object will be explained with reference to FIGS. 11, 12, 13, 14, and 15.

Figure 11:
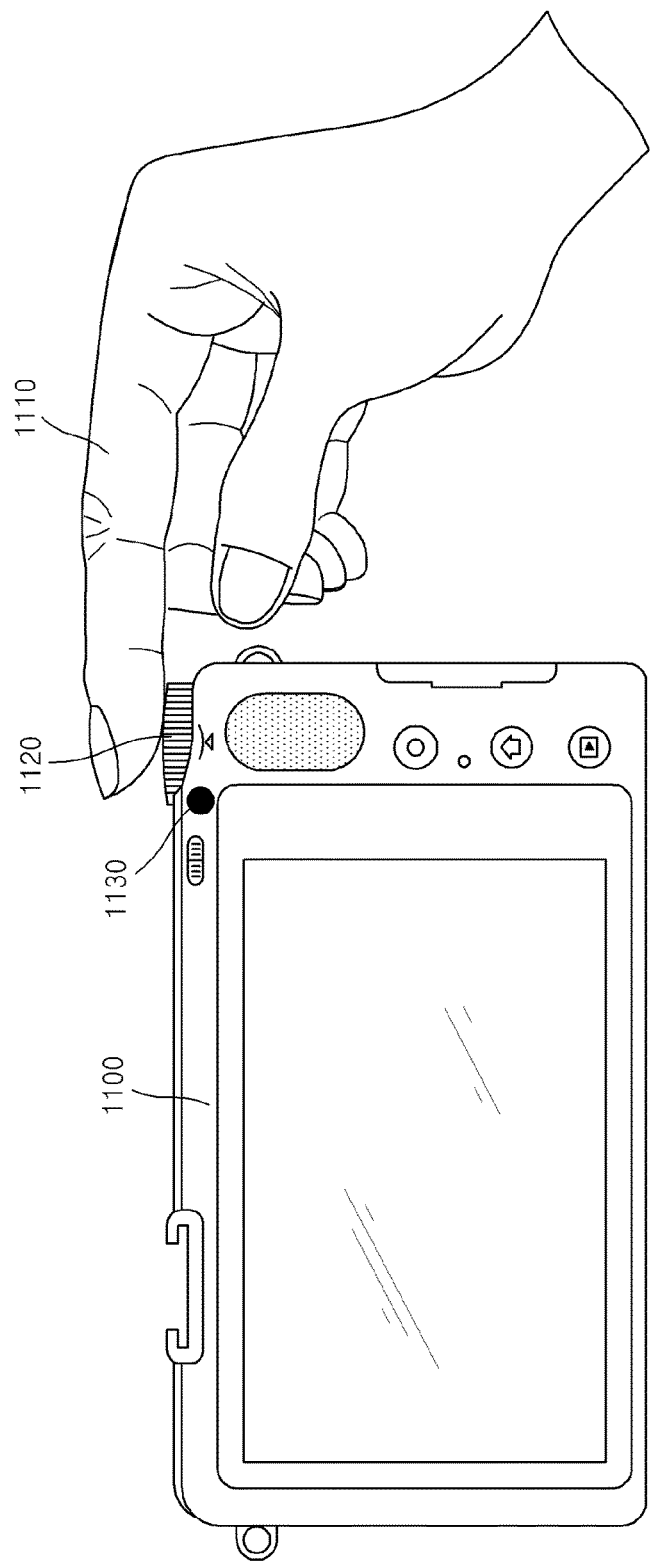
FIG. 11 is a view for explaining a method of capturing an image, according to an exemplary embodiment.

FIG. 11 is a view for explaining a method of capturing an image, according to an exemplary embodiment.

Referring to FIG. 11, a camera 1100 that is one example of the apparatus 100 may include a capture button 1120 and an approach recognition sensor 1130, i.e. a recognizer.

The approach recognition sensor 1130 recognizes that a user's finger 1110 approaches the capture button 1120 so that the camera 1100 may start to capture a plurality of images 1000.

Figure 12:
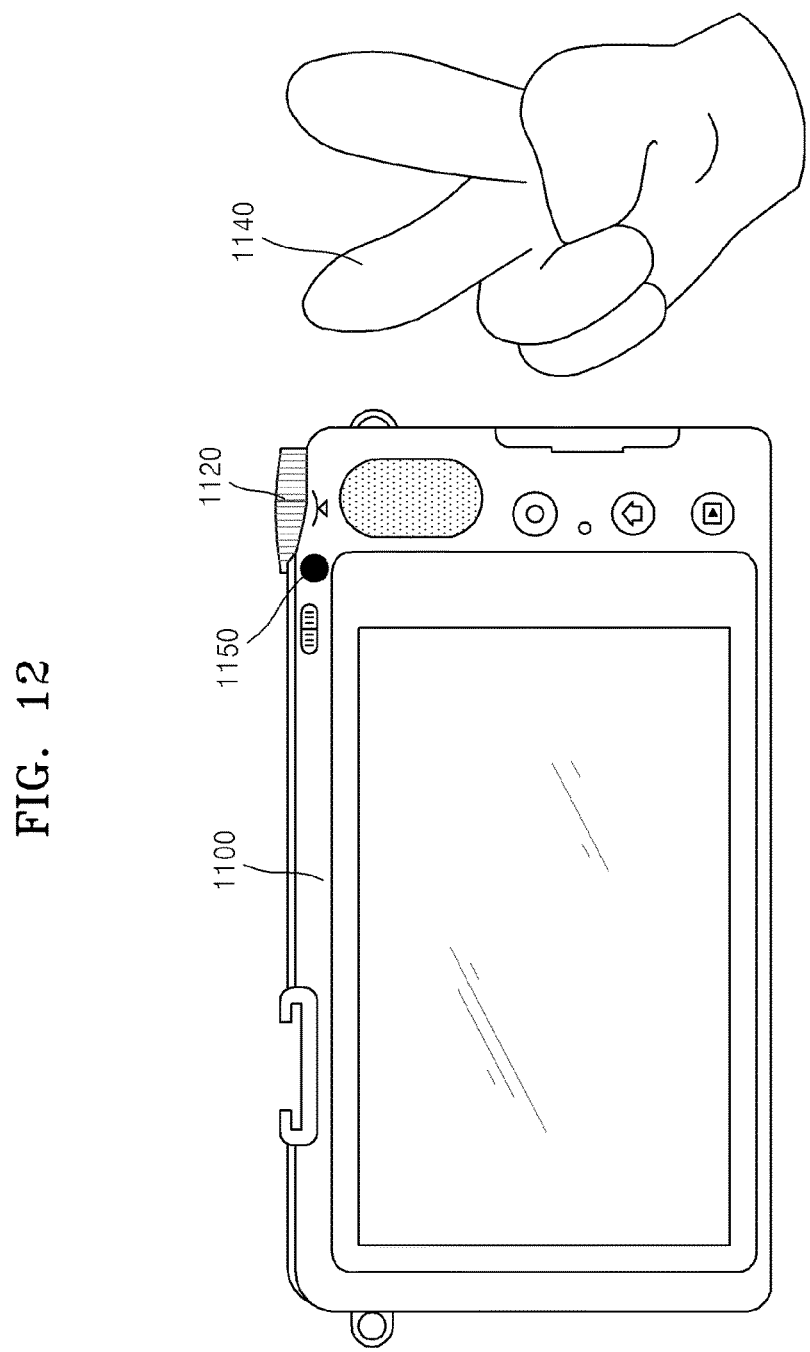
FIG. 12 is a view for explaining a method of capturing an image, according to another exemplary embodiment.

FIG. 12 is a view for explaining a method of capturing an image, according to another exemplary embodiment.

Referring to FIG. 12, the camera 1100 and the capture button 1120 have already been described with reference to FIG. 11. A motion recognition sensor 1150, i.e. a recognizer, recognizes the user's motion 1140 that is preset so that even when a motion other than a movement that approaches the capture button 1120 is made, the plurality of images 1000 may be captured. For example, the plurality of images 1000 may be captured when a motion of a specific pattern is recognized. The motion recognition sensor 1150 may recognize a speed and a direction of the object.

Figure 13:
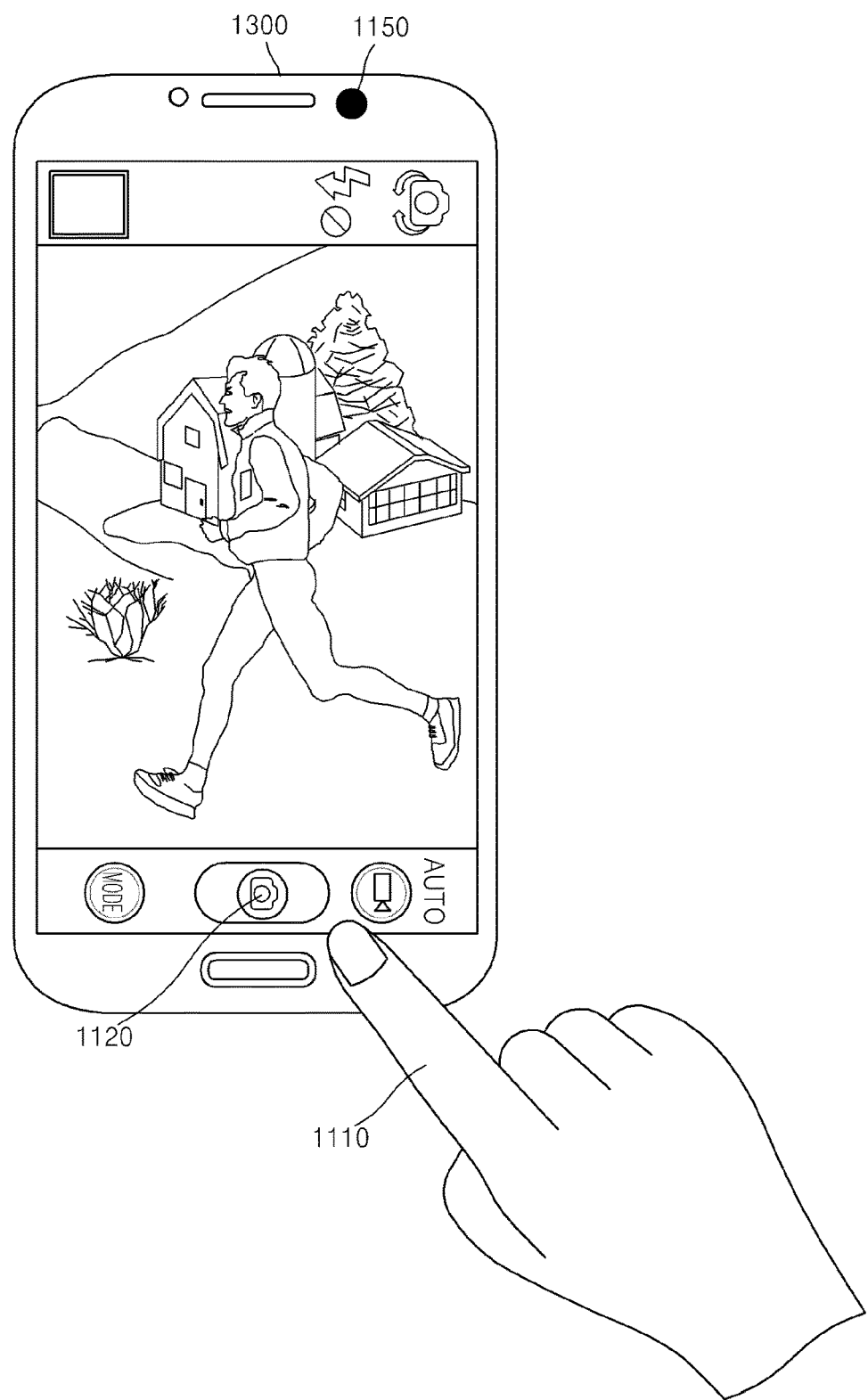
FIG. 13 is a view for explaining a method of displaying an image, according to an exemplary embodiment.

FIG. 13 is a view for explaining a method of displaying an image, according to an exemplary embodiment.

Referring to FIG. 13, a cell phone 1300 may include the motion recognition sensor 1150 and the capture button 1120. The motion recognition sensor 1150 recognizes that the user's finger 1110 approaches the capture button 1120 so that the plurality of images 1000 may be captured.

FIG. 14 is a view for explaining a method of displaying an image, according to another exemplary embodiment.

Referring to FIG. 14, a camera mounted on a smart TV 1400 may capture an image desired by the user by using a remote controller 1410. The remote controller 1410 may include the capture button 1120 and the motion recognition sensor 1150.

The motion recognition sensor 1150 recognizes that the user's finger 1110 approaches the capture button 1120 so that the plurality of images 1000 may be captured.

FIG. 15 is a view for explaining a method of displaying an image, according to another exemplary embodiment.

Referring to FIG. 15, the camera mounted on the smart TV 1400 may capture an image desired by the user by using a smart TV remote control function of the cell phone 1300. The cell phone 1300 may include the capture button 1120 and the motion recognition sensor 1150.

The motion recognition sensor 1150 recognizes that the user's finger 1110 approaches the capture button 1120 so that the camera of the smart TV 1400 may capture the plurality of images 1000.

A method of searching for a predetermined image from among the plurality of images 1000 by using the movement of the object that approaches an image capture button will be explained with reference to FIG. 10.

FIG. 10 is a view illustrating a process of selecting an image after the plurality of images are captured, according to an exemplary embodiment.

Referring to FIG. 10, the apparatus 200 may recognize the movement of the object that approaches the image capture button, may capture the plurality of images 1000 in response to the recognized movement of the object, and then may search for a predetermined image 1030 desired by the user. The plurality of images 1000 may include continuous images 1010, 1020, 1030, and 1040 that are captured for a predetermined period of time. There is no limit to the number of images that constitute the plurality of images 1000.

For example, an image desired by the user may be searched for in consideration of a time between a point of time when the movement of the object is recognized and a point of time when the image capture button is clicked, a time that is delayed, i.e., time delay, due to the operation of a camera shutter, and a time that is delayed, i.e., time delay, due to the adjustment of a camera lens.

The predetermined image may be displayed to the user, and then an image desired by the user may be re-selected.

The storage unit 250 may store the predetermined image. A unit in which the predetermined image is stored may be, but is not limited to, a storage device (for example, a memory or a hard disc) in the apparatus 200, or a device connected to the apparatus 200.

The transmission unit 260 may transmit the predetermined image to another device. The predetermined image may be transmitted through wireless communication such as WiFi or wired communication in which wires are directly connected, but the present embodiment is not limited thereto.

Figure 3:
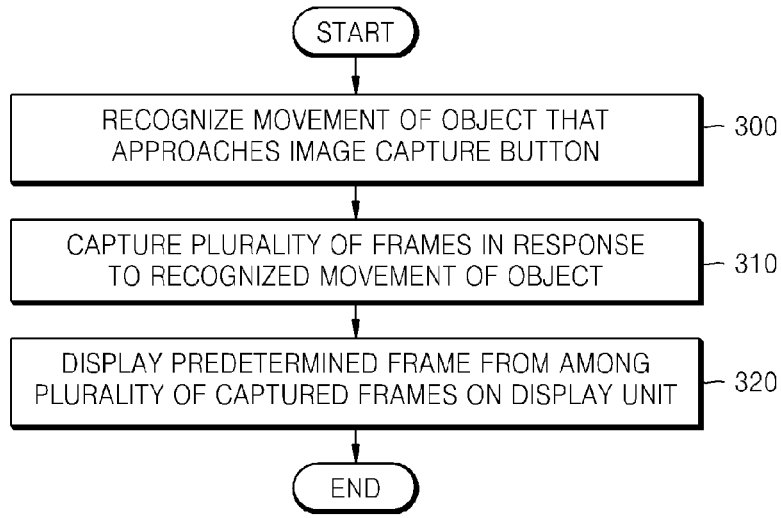
FIG. 3 is a flowchart illustrating a method of displaying an image, according to an exemplary embodiment.

FIG. 3 is a flowchart illustrating a method of displaying an image, according to an exemplary embodiment.

Referring to FIG. 3, the method includes operations that are sequentially performed by the apparatus 100 of FIG. 1. Accordingly, although omitted, the description made for the apparatus 100 of FIG. 1 may apply to the method of FIG. 3.

In operation 300, a movement of an object that approaches an image capture button may be recognized.

In operation 310, a plurality of frames may be captured in response to the recognized movement of the object.

In operation 320, a predetermined frame from among a plurality of captured frames may be displayed on a display unit.

Figure 4:
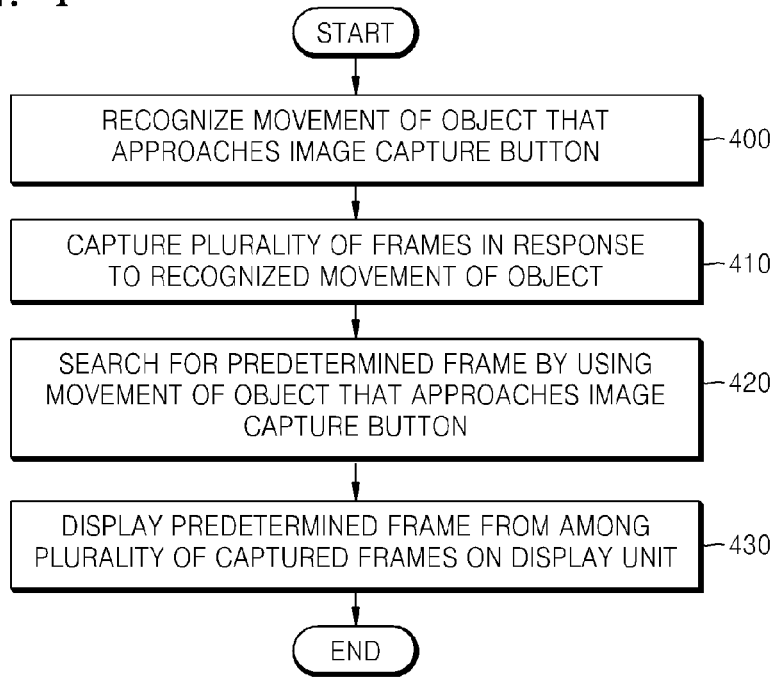
FIG. 4 is a flowchart illustrating a method of displaying an image, according to another exemplary embodiment.

FIG. 4 is a flowchart illustrating a method of displaying an image, according to another exemplary embodiment.

Referring to FIG. 4, the method includes operations that are sequentially performed by the apparatus 100 of FIG. 1. Accordingly, although omitted, the description made for the apparatus 100 of FIG. 1 may apply to the method of FIG. 4.

Operations 400, 410, and 430 are respectively the same as operations 300, 310, and 320 of FIG. 3.

In operation 420, the predetermined frame may be searched for based on the movement of the object that approaches the image capture button.

Figure 5:
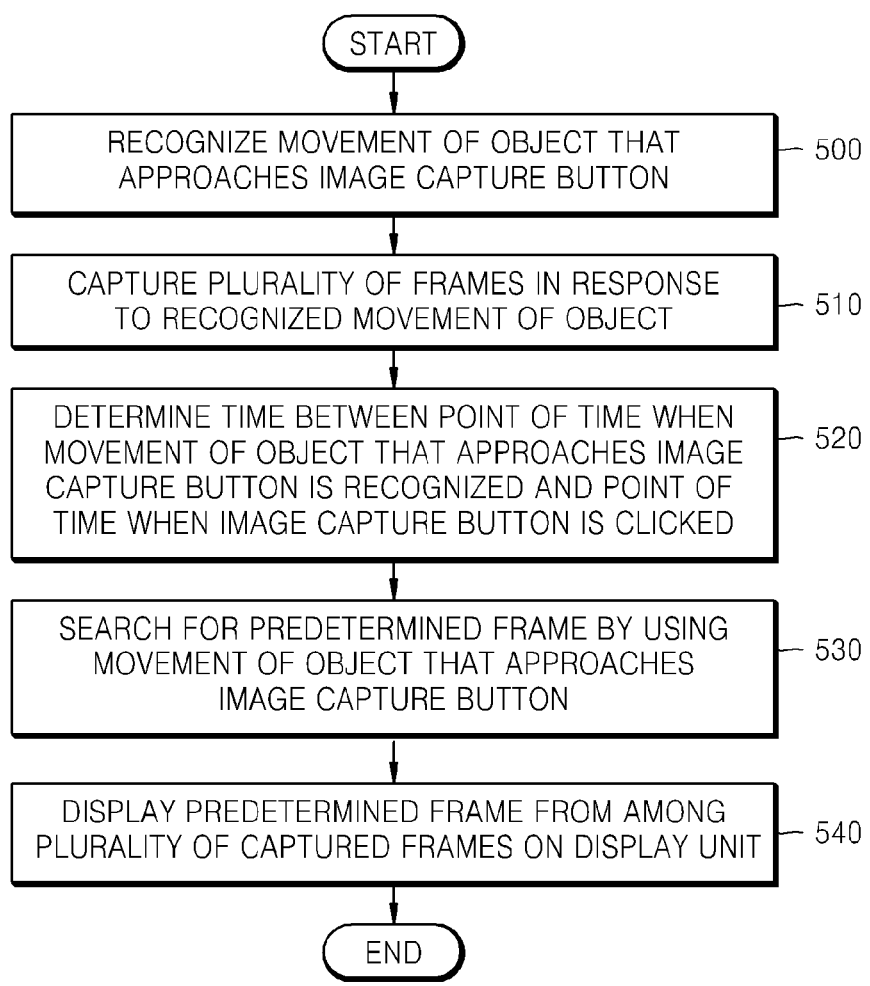
FIG. 5 is a flowchart illustrating a method of displaying an image, according to another exemplary embodiment.

FIG. 5 is a flowchart illustrating a method of displaying an image, according to another exemplary embodiment.

Referring to FIG. 5, the method includes operations that are sequentially performed by the apparatus 200 of FIG. 2. Accordingly, although omitted, the description made for the apparatus 200 of FIG. 2 may apply to the method of FIG. 5.

Operations 500, 510, and 540 are respectively the same as operations 300, 310, and 320 of FIG. 3.

In operation 520, a time between a point of time when the movement of the object that approaches the image capture button is recognized and a point of time when the image capture button is clicked may be determined.

In operation 530, the predetermined frame may be searched for based on the movement of the object that approaches the image capture button.

A method of determining the time between the point of time when the movement of the object that approaches the image capture button and the point of time when the image capture button is clicked will be explained with reference to FIG. 9.

Figure 9:
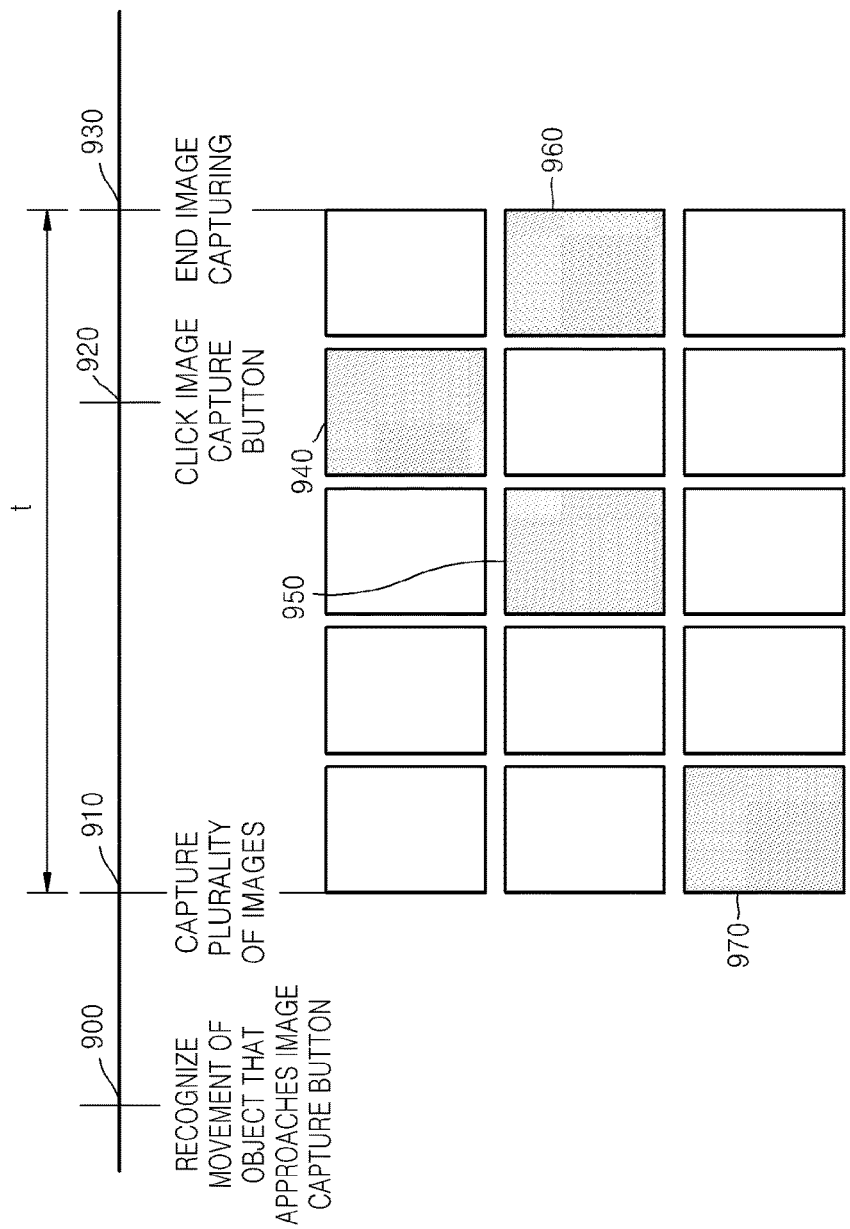
FIG. 9 is a view illustrating a delay time when an image is captured, according to an exemplary embodiment.

FIG. 9 is a view illustrating a delay time when an image is captured, according to an exemplary embodiment.

Referring to FIG. 9, a point of time 900 is a point of time when a movement of an object that approaches an image capture button is recognized, a point of time 910 is a point of time when an apparatus for displaying an image starts to capture a plurality of images, a point of time 920 is a point of time when a user clicks the image capture button, and a point of time 930 is a point of time when the apparatus ends capturing the images.

A time between the point of time 900 and the point of time 910 may include a time that is delayed due to the operation of a camera shutter and a time that is delayed due to the adjustment of a camera lens.

The apparatus 200 may capture the plurality of images during a time "t" between the point of time 910 and the point of time 930.

A time between the point of time 920 and the point of time 930 may include a time that is delayed due to the operation of the camera shutter and a time that is delayed due to the adjustment of the camera lens.

The apparatus 200 may display an image 940 that is captured at the point of time 920, an image 950 that is an image one frame prior to the image 940, an image 960 that is an image one frame following the image 940, or an image 970 that is an image first captured by recognizing the movement of the object, by searching for the plurality of captured images, as a predetermined image that is desired by the user. Also, the apparatus 200 may display an image that is last captured as a search result. A search method may be arbitrarily designated by the user or may be automatically set.

The apparatus 200 may automatically search for a predetermined image that is desired by the user from among the plurality of captured images and may display the predetermined image on a screen.

Also, all of the plurality of captured images may be displayed on the screen, and the predetermined image that is desired by the user from among the plurality of images may be marked.

The apparatus 200 may store patterns in which the user selects the desired predetermined image in a pattern history, and may use the stored patterns when the user searches for the desired predetermined image from among the plurality of images. For example, when a pattern in which the user selects the image that is captured at the point of time when the image capture button is clicked is stored in the pattern history, the image 940 may be displayed as a search result when the user captures other plurality of images next time.

A result obtained after the user searches for the desired predetermined image may be displayed as one image, or two or more images.

Figure 6:
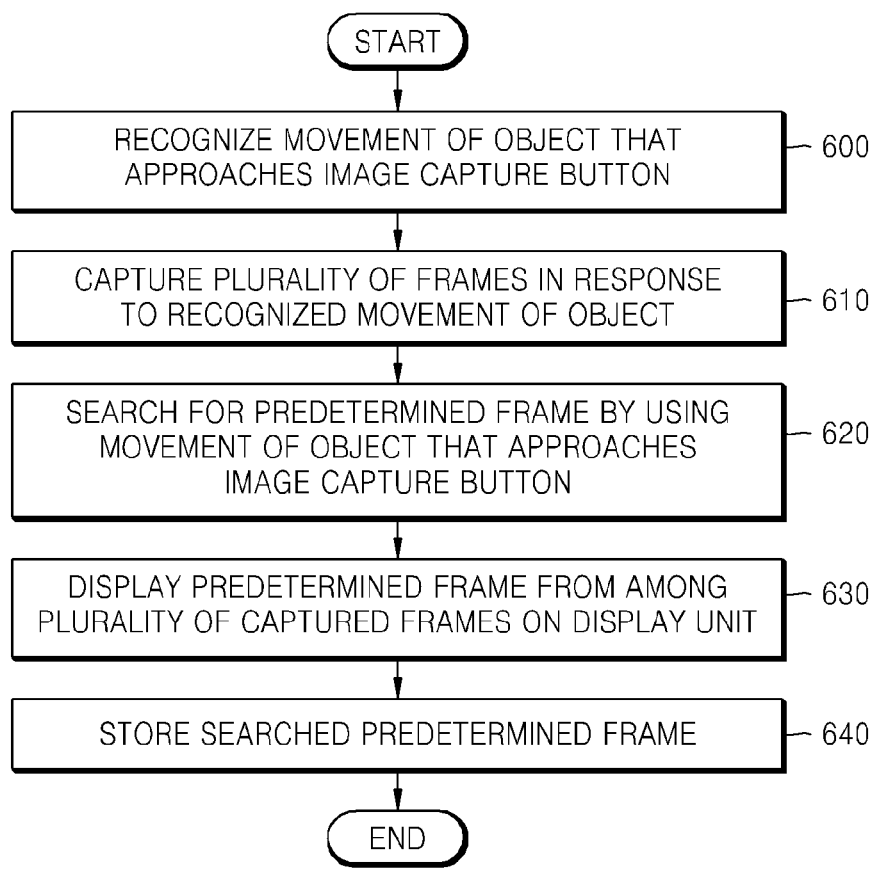
FIG. 6 is a flowchart illustrating a method of displaying an image, according to another exemplary embodiment.

FIG. 6 is a flowchart illustrating a method of displaying an image, according to another exemplary embodiment.

Referring to FIG. 6, the method includes operations that are sequentially performed by the apparatus 200 of FIG. 2. Accordingly, although omitted, the description made for the apparatus 200 of FIG. 2 may apply to the method of FIG. 6.

Operations 600, 610, and 630 are respectively the same as operations 300, 310, and 320 of FIG. 3.

In operation 620, a predetermined frame may be searched for by using the movement of the object that approaches the image capture button.

In operation 640, the searched for predetermined frame may be stored.

The predetermined frame may be stored in a memory card in the apparatus 200, or an external storage device that is connected to the apparatus 200.

Figure 7:
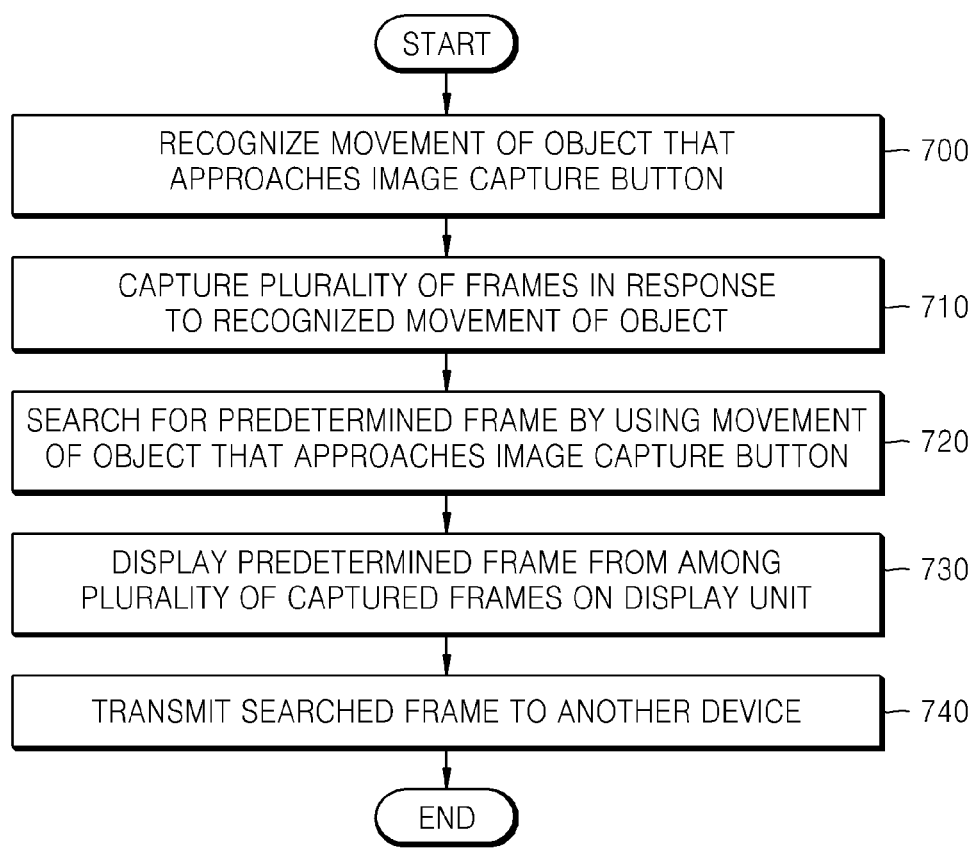
FIG. 7 is a flowchart illustrating a method of displaying an image, according to another exemplary embodiment.

FIG. 7 is a flowchart illustrating a method of displaying an image, according to another exemplary embodiment.

Referring to FIG. 7, the method includes operations that are sequentially performed by the apparatus 200 of FIG. 2. Accordingly, although omitted, the description made for the apparatus 200 of FIG. 2 may apply to the method of FIG. 7.

Operations 700, 710, and 730 are respectively the same as operations 300, 310, and 320 of FIG. 3.

In operation 720, a predetermined frame may be searched for based on the movement of the object that approaches the image capture button.

In operation 740, the predetermined frame may be transmitted to another device.

The other device may include another apparatus for displaying an image, or another storage device.

Figure 8:
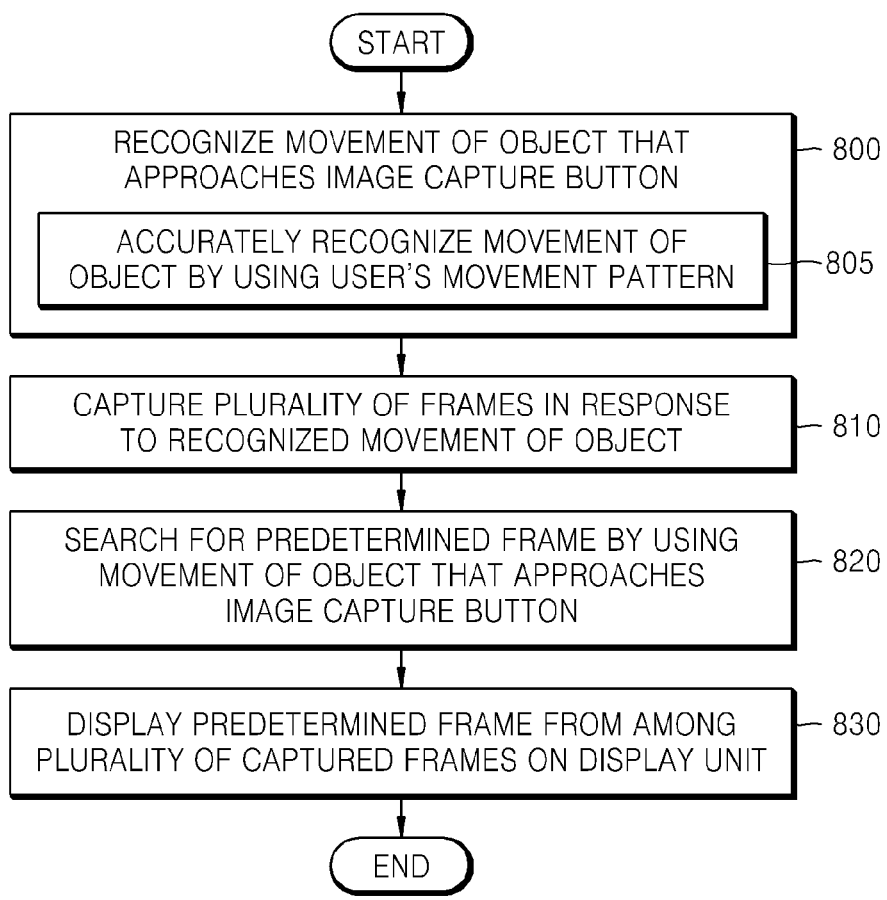
FIG. 8 is a flowchart illustrating a method of displaying an image, according to another exemplary embodiment.

FIG. 8 is a flowchart illustrating a method of displaying an image, according to another exemplary embodiment.

Referring to FIG. 8, the method includes operations that are sequentially performed by the apparatus 200 of FIG. 2. Accordingly, although omitted, the description made for the apparatus 200 of FIG. 2 may apply to the method of FIG. 8.

Operations 800, 810, and 830 are respectively the same as operations 300, 310, and 320 of FIG. 3.

In operation 805, the recognizing of the movement of the object that approaches the image capture button may include accurately recognizing the movement of the object by using the user's movement pattern (for example, the user's finger movement pattern). The user's finger movement pattern may include a pattern that is preset in the apparatus 200 and in which the user's finger moves. Also, the movement of the object may be accurately recognized by storing a pattern in which the user's finger often moves and then calculating a movement of the user's finger in the pattern.

In operation 820, a predetermined frame may be searched for by using the movement of the object that approaches the image capture button.

FIG. 16 is a view for explaining a method of transmitting an image, according to an exemplary embodiment.

The smart TV 1400, the cell phone 1300, and the camera 1100 may transmit captured images to one another. A transmission method may include, but is not limited to, a method using communication, a wired transmission method using cables, and a transmission method using an infrared signal.

The present embodiment is not limited to FIG. 16, and the images may be transmitted to other storage devices.

Alternatively, an apparatus for displaying an image may include a memory that stores a command and a communication interface for setting communication.

The communication interface may provide two-way data communication connected to a processor. For example, the communication interface may be an integrated services digital network (ISDN) card or a modem that provides data communication over corresponding telephone lines. Alternatively, the communication interface may be a local area network (LAN) card that provides data communication to a compatible LAN.

Alternatively, the apparatus for displaying an image may include a bus, a communication unit for communication information, or a bus for processing information. The apparatus for displaying an image may include a memory. The memory may include random access memory (RAM) or another dynamic storage device, and may be coupled to a bus for storing information and a command executed by a processor. The memory may be used to store a temporary variable or another intermediate information while the command is executed by the processor.

The apparatus for displaying an image may include read only memory (ROM), or another static storage device that is connected to a bus for storing a command for a processor and static information. A storage device such as a magnetic disc or an optical disc may be provided by being coupled to a bus in order to store information that is a plurality of frames related to a photographic image.

The present invention may be embodied as a program executed in a computer, and may be implemented in a general purpose digital computer by using a computer-readable recording medium.

Examples of the computer-readable recording medium include magnetic storage media (e.g., ROMs, floppy disks, hard disks, etc.), and optical recording media (e.g., CD-ROMs or DVDs).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation.

What is claimed is:

1. A method of displaying an image, the method comprising:
   recognizing a movement of an object as the object approaches an image capture button;
   capturing a plurality of frames after recognizing the movement of the object as the object approaches the image capture button, until the image capture button is touched or pushed by the object;
   recognizing the image capture button being touched or pushed by the object;
   determining a frame from among the plurality of captured frames after recognizing the image capture button being touched or pushed by the object, based on a pattern in which a user selects at least one frame that is captured at each point of time; and
   displaying the determined frame on a display.

2. The method of claim 1, wherein the determining comprises determining the frame from among the plurality of captured frames based on at least one of a time delay due to an operation of a camera shutter and a time delay due to an adjustment of a camera lens based on the determined time.

3. The method of claim 1, further comprising storing the determined frame.

4. The method of claim 1, further comprising transmitting the determined frame to another device.

5. The method of claim 1, wherein the movement of the object comprises a movement of a user's finger.

6. The method of claim 1, wherein the image capture button is provided in any one of a digital camera, a cell phone that has a camera function, and a remote controller of a TV that has an image capturing function.

7. The method of claim 1, wherein the recognizing comprises recognizing the movement of the object by using a user's movement pattern.

8. A non-transitory computer-readable recording medium having embodied thereon a program for executing the method of claims 1.

9. The method of claim 1, wherein the determining comprises determining the frame based on a selection history of a user.

10. An apparatus for displaying an image, the apparatus comprising:
    a sensor configured to recognize a movement of an object as the object approaches an image capture button and recognize the image capture button being touched or pushed by the object;
    a capture processor configured to capture a plurality of frames after recognizing the movement of the object as the object approaches the image capture button, until the image capture button is touched or pushed by the object; and
    a display configured to display a frame determined from among the plurality of captured frames, based on a pattern in which a user selects at least one frame that is captured at each point of time.

11. The apparatus of claim 10, wherein the frame from among the plurality of captured frames is determined based on at least one of a time delay due to an operation of a camera shutter and a time delay due to an adjustment of a camera lens based on the determined time.

12. The apparatus of claim 10, further comprising a storage configured to store the determined frame.

13. The apparatus of claim 10, further comprising a transmitter configured to transmit the determined frame to another device.

14. The apparatus of claim 10, wherein the image capture button is provided in any one of a digital camera, a cell phone that has a camera function, and a remote controller of a TV that has an image capturing function.

15. The apparatus of claim 10, wherein the sensor is configured to recognize the movement of the object by using a user's movement pattern.

16. The apparatus of claim 10, wherein the sensor is further configured to recognize the movement of the object based on a speed of the object.

17. The apparatus of claim 10, wherein the sensor is further configured to recognize the movement of the object based on a direction of the object.

18. The apparatus of claim 10, wherein the sensor is further configured to recognize the movement of the object based on a speed of the object and a direction of the object.

19. The apparatus of claim 10, wherein the sensor is further configured to recognize the movement of the object by comparing a pattern of the object with a preset pattern.

20. The apparatus of claim 10, wherein the capture processor is further configured to determine a time between a point of time when the movement that approaches the image capture button is recognized and a point of time when the image capture button is touched or selected by the object, and determine the frame displayed by the display based on the time as determined.

* * * * *